United States Patent
Katrak

(10) Patent No.: US 7,953,536 B2
(45) Date of Patent: May 31, 2011

(54) INERTIAL SENSOR SOFTWARE ARCHITECTURE SECURITY METHOD

(75) Inventor: Kerfegar K. Katrak, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1342 days.

(21) Appl. No.: 11/460,348

(22) Filed: Jul. 27, 2006

(65) Prior Publication Data

US 2007/0027603 A1 Feb. 1, 2007

Related U.S. Application Data

(60) Provisional application No. 60/703,651, filed on Jul. 29, 2005.

(51) Int. Cl.
*G06F 19/00* (2006.01)
(52) U.S. Cl. ........... 701/70; 701/29; 701/33; 701/36; 701/220; 701/221; 340/436; 340/438; 340/905
(58) Field of Classification Search .......... None
See application file for complete search history.

(56) References Cited

U.S. PATENT DOCUMENTS

| | | | | |
|---|---|---|---|---|
| 4,303,978 A * | 12/1981 | Shaw et al. | ............ | 701/220 |
| 5,029,892 A * | 7/1991 | Miwa | ............ | 280/5.51 |
| 5,369,584 A * | 11/1994 | Kajiwara | ............ | 701/48 |
| 5,654,888 A * | 8/1997 | Muller et al. | ............ | 701/54 |
| 5,732,377 A * | 3/1998 | Eckert | ............ | 701/83 |
| 5,995,892 A * | 11/1999 | Kiribayashi et al. | ............ | 701/45 |
| 6,243,629 B1 * | 6/2001 | Sugimoto et al. | ............ | 701/29 |
| 6,305,760 B1 * | 10/2001 | Otake | ............ | 303/122.05 |
| 6,496,946 B2 * | 12/2002 | Bannatyne et al. | ............ | 714/25 |
| 6,813,527 B2 * | 11/2004 | Hess | ............ | 700/82 |
| 6,915,200 B2 * | 7/2005 | Tsuchiya | ............ | 701/70 |
| 6,952,637 B2 * | 10/2005 | Barron et al. | ............ | 701/48 |
| 7,072,751 B2 * | 7/2006 | Shimizu | ............ | 701/36 |
| 7,427,929 B2 * | 9/2008 | Bauer et al. | ............ | 340/905 |
| 7,656,286 B2 * | 2/2010 | Benson et al. | ............ | 340/508 |
| 2001/0027893 A1 * | 10/2001 | Nishizaki et al. | ............ | 180/409 |
| 2002/0016661 A1 * | 2/2002 | Frediani et al. | ............ | 701/69 |
| 2002/0056056 A1 * | 5/2002 | Bannatyne et al. | ............ | 714/25 |
| 2004/0026158 A1 * | 2/2004 | Rieth et al. | ............ | 180/402 |
| 2004/0098140 A1 * | 5/2004 | Hess | ............ | 700/3 |
| 2004/0243368 A1 * | 12/2004 | Hiemer et al. | ............ | 703/8 |
| 2005/0159853 A1 * | 7/2005 | Takahashi et al. | ............ | 701/1 |
| 2005/0178600 A1 * | 8/2005 | Kincaid | ............ | 180/268 |
| 2006/0020378 A1 * | 1/2006 | Salman et al. | ............ | 701/29 |
| 2006/0020379 A1 * | 1/2006 | Salman et al. | ............ | 701/29 |
| 2006/0111829 A1 * | 5/2006 | Williams | ............ | 701/79 |

(Continued)

*Primary Examiner* — Khoi Tran
*Assistant Examiner* — Jonathan L Sample
(74) *Attorney, Agent, or Firm* — Ingrassia Fisher & Lorenz, P.C.

(57) ABSTRACT

A method and apparatus is provided for validating a plurality of data, comprising transmitting one or more first values for a variable from a first source of values to a first processor, transmitting one or more second values for the variable from a second source of values to the first processor, transmitting one or more third values for the variable from the first source of values for to the second processor, transmitting one or more fourth values for the variable from the second source to the first processor, comparing the one or more first values for the variable with the one or more third values for the variable, comparing the one or more second values for the variable with the one or more third values for the variable, and comparing the one or more second values for the variable with the one or more fourth values for the variable.

20 Claims, 10 Drawing Sheets

U.S. PATENT DOCUMENTS

2006/0232128 A1* 10/2006 Weiberle et al. .............. 303/187
2006/0253240 A1* 11/2006 Rao et al. ........................ 701/48
2007/0027586 A1* 2/2007 Deng et al. ........................ 701/1

* cited by examiner

INERTIAL SENSOR SOFTWARE ARCHITECTURE SECURITY METHOD

CROSS-REFERENCE TO RELATED APPLICATION

This application claims the benefit of U.S. Provisional Ser. No. 60/703,651 filed Jul. 29, 2005.

TECHNICAL FIELD.

The present invention generally relates to control systems found on automobiles and other vehicles, and more particularly relates to methods and systems for ensuring the security of data processed within a vehicle-based control system.

BACKGROUND OF THE INVENTION

Modern automobiles and other vehicles may include sophisticated on-board computer systems that monitor the status and performance of various components of the vehicle (for example, the vehicle engine, transmission, brakes, suspension, and/or other components of the vehicle). Many of these computer systems may also adjust or control one or more operating parameters of the vehicle in response to operator instructions, road or weather conditions, operating status of the vehicle, and/or other factors.

Various types of microcontroller or microprocessor-based controllers found on many conventional vehicles include supervisory control modules (SCMs), engine control modules (ECMs), controllers for various vehicle components (for example, anti-lock brakes, electronically-controlled transmissions, or other components), among other modules. Such controllers are typically implemented with any one of numerous types of microprocessors, microcontrollers or other control devices that appropriately receive data from one or more sensors or other sources, process the data to create suitable output signals, and provide the output signals to control actuators, dashboard indicators and/or other data responders as appropriate. The various components of a vehicle-based control system typically inter-communicate with each other and/or with sensors, actuators and the like across any one of numerous types of serial and/or parallel data links. Today, data processing components within a vehicle are commonly interlinked by a data communications network such as a Controller Area Network (CAN), an example of which is described in ISO Standard 11898-1 (2003).

Because vehicles may now process relatively large amounts of digital data during operation, it can be an engineering challenge to ensure that the data processed is accurate and reliable. As digital data is stored, processed, consumed and/or shared between or within the various data processing components of a vehicle, for example, bit errors and the like can occur due to environmental factors, hardware faults, data transmission issues and other causes. As a result, various techniques have been developed to ensure the integrity of data processed and transferred within the vehicle. However, because there may be limited space in serial data messages, there is a need for a technique utilizing less message space.

It remains desirable to formulate systems and methods for ensuring data security within vehicle control systems. Other desirable features and characteristics will become apparent from the subsequent detailed description and the appended claims, taken in conjunction with the accompanying drawings and the foregoing technical field and background.

SUMMARY OF THE INVENTION

A method is provided for validating a plurality of data transmitted in a system. In one embodiment, and by way of example only, the plurality of data is at least for one variable transmitted in the system, the system comprises a first processor, a second processor, a first source of values for the variable, and a second source of values for the variable, and the method comprises the steps of transmitting one or more first values for the variable from the first source of values for the variable to the first processor, transmitting one or more second values for the variable from the second source of values for the variable to the first processor, transmitting one or more third values for the variable from the first source of values for the variable to the second processor, transmitting one or more fourth values for the variable from the second source of values for the variable to the first processor, comparing the one or more first values for the variable with the one or more third values for the variable, comparing the one or more second values for the variable with the one or more third values for the variable, and comparing the one or more second values for the variable with the one or more fourth values for the variable.

In another embodiment, and by way of example only, the plurality of data includes at least a yaw rate variable, a lateral acceleration variable, and a longitudinal acceleration variable, transmitted in a system comprising a first processor, a second processor, a first yaw sensor and a second yaw sensor for measuring values for the yaw rate variable, a first lateral acceleration sensor and a second lateral acceleration sensor for measuring values for the lateral acceleration variable, and a longitudinal sensor for measuring values for the longitudinal variable, and the method comprises the steps of transmitting one or more first yaw rate values from the first yaw sensor to the first processor, transmitting one or more second yaw rate values from the second yaw sensor to the first processor, transmitting one or more third yaw rate values from the first yaw sensor to the second processor, transmitting one or more fourth yaw rate values from the second yaw sensor to the first processor, transmitting one or more first lateral acceleration values from the first lateral acceleration sensor to the first processor, transmitting one or more second lateral acceleration values from the second lateral acceleration sensor to the first processor, transmitting one or more third lateral acceleration values from the first lateral acceleration sensor to the second processor, transmitting one or more fourth lateral acceleration values from the second lateral acceleration sensor to the first processor, transmitting one or more first longitudinal values from the longitudinal sensor to the first processor, transmitting one or more second longitudinal values from the longitudinal sensor to the first processor, comparing the one or more first yaw rate values with the one or more third yaw rate values, comparing the one or more second yaw rate values with the one or more third yaw rate values, comparing the one or more second yaw rate values with the one or more fourth yaw rate values, comparing the one or more first lateral acceleration values with the one or more third lateral acceleration values, comparing the one or more second lateral acceleration values with the one or more third lateral acceleration values, comparing the one or more second lateral acceleration values with the one or more fourth lateral acceleration values, and comparing the one or more first longitudinal values with the one or more second longitudinal values.

In yet another embodiment, and by way of example only, the method comprises transmitting one or more first yaw rate values from the first yaw sensor to the first processor, transmitting one or more second yaw rate values from the second yaw sensor to the first processor, transmitting one or more third yaw rate values from the first yaw sensor to the second processor, transmitting one or more fourth yaw rate values from the second yaw sensor to the second processor, transmitting one or more first lateral acceleration values from the first lateral acceleration sensor to the first processor, transmitting one or more second lateral acceleration values from the second lateral acceleration sensor to the first processor, transmitting one or more third lateral acceleration values from the first lateral acceleration sensor to the second processor, transmitting one or more fourth lateral acceleration values from the second lateral acceleration sensor to the second processor, transmitting one or more first longitudinal values from the longitudinal sensor to the first processor, transmitting one or more second longitudinal values from the longitudinal sensor to the first processor, comparing the one or more first yaw rate values with the one or more third yaw rate values, comparing the one or more second yaw rate values with the one or more third yaw rate values, comparing the one or more second yaw rate values with the one or more fourth yaw rate values, comparing the one or more first lateral acceleration values with the one or more second lateral acceleration values, comparing the one or more second lateral acceleration values with the one or more third lateral acceleration values, comparing the one or more second lateral acceleration values with the one or more fourth lateral acceleration values, and comparing the one or more first longitudinal values with the one or more second longitudinal values.

An apparatus is provided for validating a plurality of variable data. In one embodiment, and by way of example only, the plurality of variable data includes at least a yaw rate variable, a lateral acceleration variable, and a longitudinal acceleration variable, transmitted in a system comprising a first processor, a second processor, a first yaw sensor and a second yaw sensor for measuring values for the yaw rate variable, a first lateral acceleration sensor and a second lateral acceleration sensor for measuring values for the lateral acceleration variable, and a longitudinal sensor for measuring values for the longitudinal variable, the apparatus comprising means for transmitting one or more first yaw rate values from the first yaw sensor to the first processor, means for transmitting one or more second yaw rate values from the second yaw sensor to the first processor, means for transmitting one or more third yaw rate values from the first yaw sensor to the second processor, means for transmitting one or more fourth yaw rate values from the second yaw sensor to the first processor, means for transmitting one or more first lateral acceleration values from the first lateral acceleration sensor to the first processor, means for transmitting one or more second lateral acceleration values from the second lateral acceleration sensor to the first processor, means for transmitting one or more third lateral acceleration values from the first lateral acceleration sensor to the second processor, means for transmitting one or more fourth lateral acceleration values from the second lateral acceleration sensor to the first processor, means for transmitting one or more first longitudinal values from the longitudinal sensor to the first processor, means for transmitting one or more second longitudinal values from the longitudinal sensor to the first processor, means for comparing the one or more first yaw rate values with the one or more third yaw rate values, means for comparing the one or more second yaw rate values with the one or more third yaw rate values, means for comparing the one or more second yaw rate values with the one or more fourth yaw rate values, means for comparing the one or more first lateral acceleration values with the one or more third lateral acceleration values, means for comparing the one or more second lateral acceleration values with the one or more third lateral acceleration values, means for comparing the one or more second lateral acceleration values with the one or more fourth lateral acceleration values, and means for comparing the one or more first longitudinal values with the one or more second longitudinal values.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
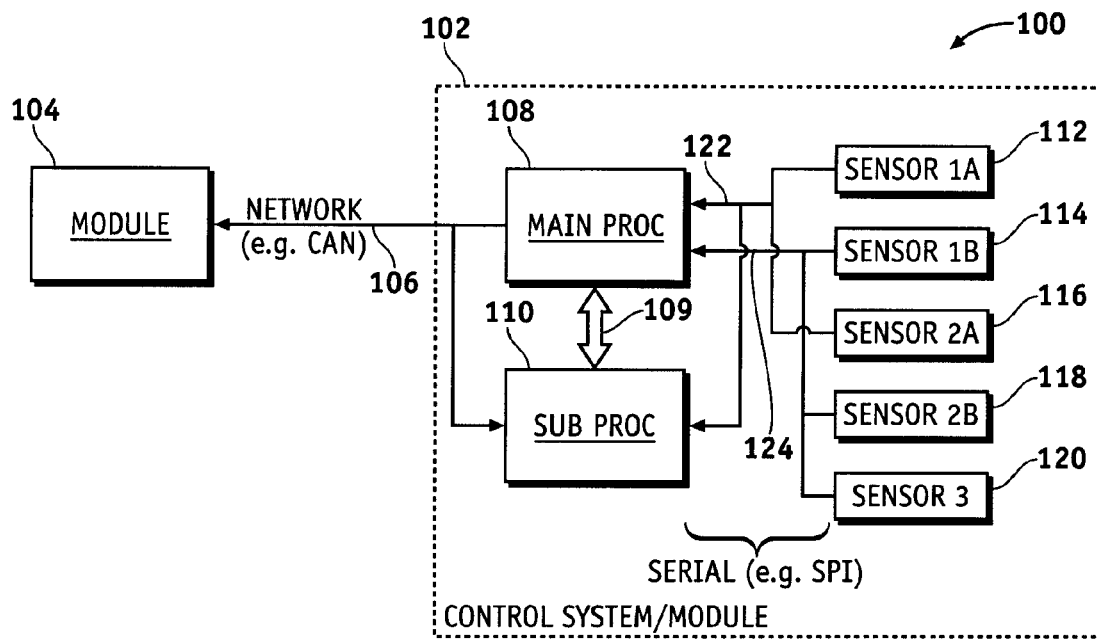
FIG. 1 depicts an embodiment of a control system for processing and/or transmitting data in an automobile.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, various methods and systems are presented for ensuring the integrity, security and/or reliability of data obtained, transmitted and/or processed by a control system. With reference to the FIGS. 1-3, an exemplary control system 100 suitably includes any number of modules 102, 104 that exchange data via a data link 106. In various embodiments, link 106 is a Controller Area Network (CAN) or other data network connection. Modules 102, 104 may be any one of numerous types of systems or devices having any one of numerous types of data processing hardware, such as any one of numerous types of microprocessors or microcontrollers, such as a transmitter 102 and a receiver 104.

Preferably one or more transmitters 102 suitably include any number of redundant processors, such as a main processor 108 and a sub-processor 110, interconnected by a conventional data connection 109 as appropriate. In various embodiments, connection 109 is a UART or other internal connection (e.g., a bus connection) within transmitter 102. The processors 108 and/or 110 may be further configured to communicate with various numbers of sensors 112-120, actuators, indicators or other components as appropriate. Such connections may be provided over any type of serial, parallel, wireless or other data communication medium such as a Serial Peripheral Interface (SPI) connection or the like.

In various embodiments described below, sensors 112-120 include various sensors such as primary and redundant sensors for a first variable, namely sensors 112 and 114 (respectively), primary and redundant sensors for a second variable, namely sensors 116 and 118 (respectively), and/or a sensor for a third variable, namely sensor 120. In two preferred embodiments depicted in FIGS. 2 and 3, these sensors include primary and redundant yaw sensors 112, 114 (respectively), primary and redundant lateral acceleration sensors 116, 118, and/or a longitudinal acceleration sensor 120. Although this description emphasizes inertial sensors for purposes of illustration, similar concepts could be applied to various other types of sensors, actuators, indicators or other devices that are capable of transmitting or receiving data.

Figure 2:
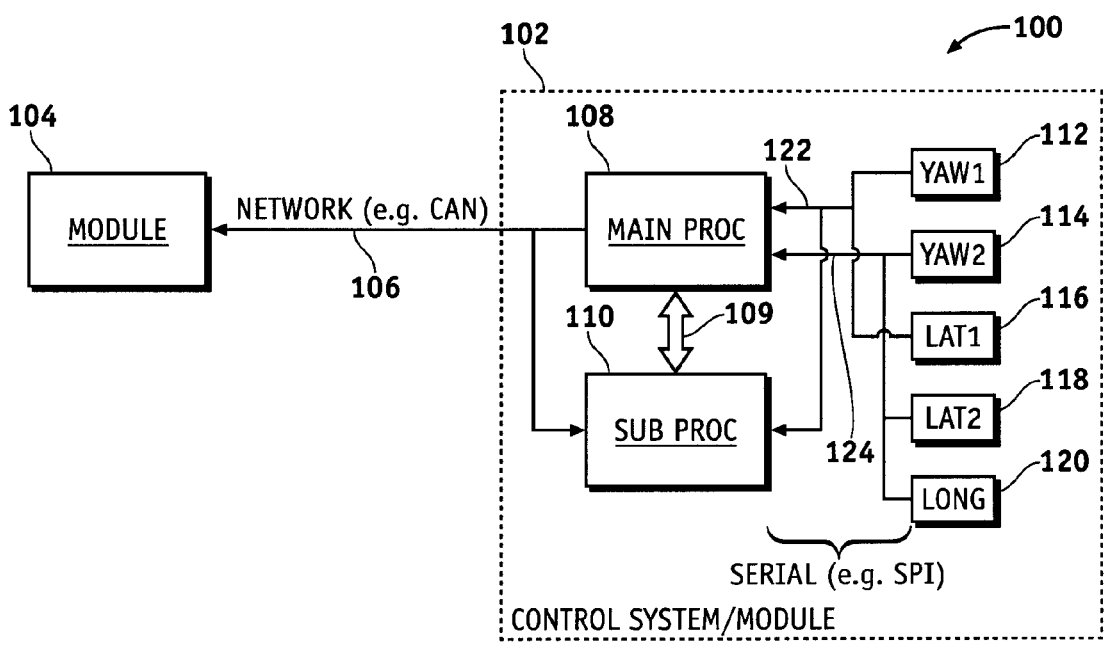
FIG. 2 depicts an implementation of an embodiment of a control system for processing and/or transmitting data in an automobile.

In both of these embodiments, increased reliability is provided through the use of redundant sensors and data processing. In the embodiment of FIG. 2, sensor data from the primary yaw sensor 112 and the primary lateral acceleration sensor 116 can be obtained by both the main processor 108 and the sub-processor 110 via a first serial connection 122, while sensor data from the redundant yaw sensor 114, the redundant lateral acceleration sensor 118, and the longitudinal acceleration sensor 120 can be obtained by the main processor 108 via a second serial connection 124.

Figure 3:
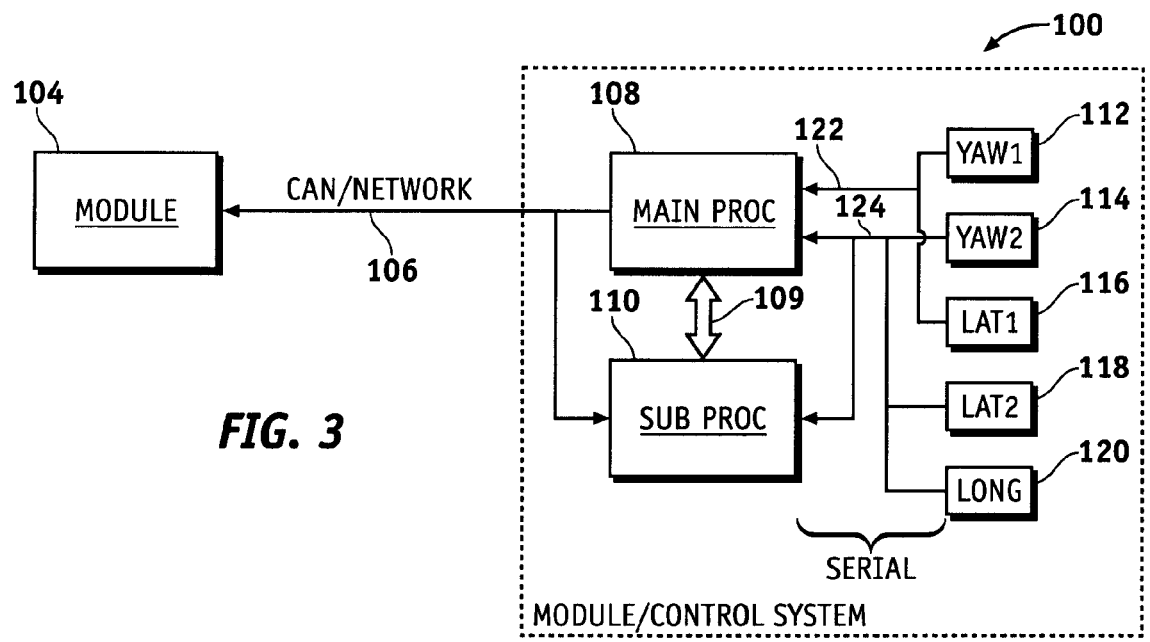
FIG. 3 depicts an alternative implementation of an embodiment of a control system for processing and/or transmitting data in an automobile.

Alternatively, in the embodiment of FIG. 3, sensor data from the primary yaw sensor 112 and the primary lateral acceleration sensor 116 can be obtained by the main processor 108 via the first serial connection 122, while sensor data from the redundant yaw sensor 114, the redundant lateral acceleration sensor 118, and the longitudinal acceleration sensor 120 can be obtained by both the main processor 108 and the sub-processor 110 via the second serial connection 124. However, it will be appreciated that various combinations of data values from these and/or other sources can be obtained by the main processor 108 and/or the sub-processor 110.

In each of the embodiments of FIGS. 1-3, the main processor 108 and the sub-processor 110 are interconnected via the data connection 109, and one or more of the processors (preferably at least the main processor 108) communicates with the receiver 104 via the data link 106. In practice, data from any sensor 112-120 could be provided to any processor 108, 110 or other component through a single serial link, and/or through any number of additional links.

Figure 4:
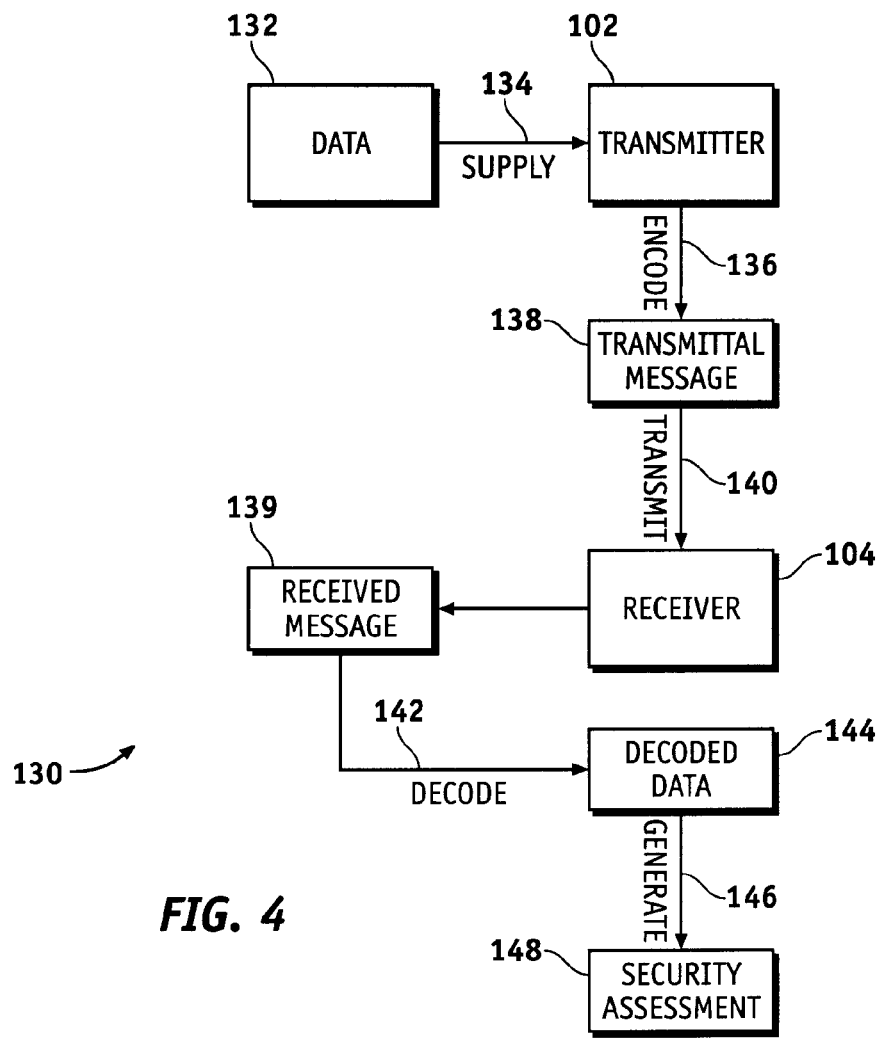
FIG. 4 depicts a method of preserving data transmitted in an automobile.

The security of information may be preserved even as the data is transmitted from the transmitter 102 across link 106 to the receiver 104 using a data preserving method 130, as set forth in FIGS. 4-7. FIG. 4 provides a general overview of the data preserving method 130. First, data 132 is supplied to the transmitter 102 in step 134. It will be appreciated that the data 132 can be supplied to the transmitter 102 by means of any one of a number of different mechanisms, for example from the sensors 112-120 through the serial connections 122, 124 as set forth in FIGS. 1-3 above, among various other potential mechanisms. Next, in step 136 the transmitter 102 encodes the data 132, generating a transmittal message 138.

Next, in step 140, the transmittal message 138 is transmitted along the link 106 to the receiver 104, where it is received in the form a received message 139. It will be appreciated that the receiver 104 can include any one of a number of different types of modules or other types of receivers. Next, in step 142 the receiver 104 decodes the received message 139, thereby generating decoded data 144. Next, in step 146, the decoded data 144 is used to generate a security assessment 148 of the information received by the receiver 104.

As will be described in greater detail below in connection with FIGS. 5 and 6, the encoding step 136 relates to a technique for encoding data wherein a transmittal message 138 sent across link 106 includes a data component 150 and a transmitted pre-transmittal checksum 152 determined from a redundant path. "Checksum" in this case, and referenced throughout this application, can refer to any sort of parity, cyclic redundancy code (CRC), digest, or other technique for representing the contents of the transmittal message 138.

As will be described in greater detail below in connection with FIGS. 5 and 7, the decoding step 142 preferably includes making a copy of the received message 139, calculating a post-transmittal checksum 154 of the received data component 151 of the received message 139, and comparing the post-transmittal checksum 154 with a received pre-transmittal checksum 181.

Figure 5:
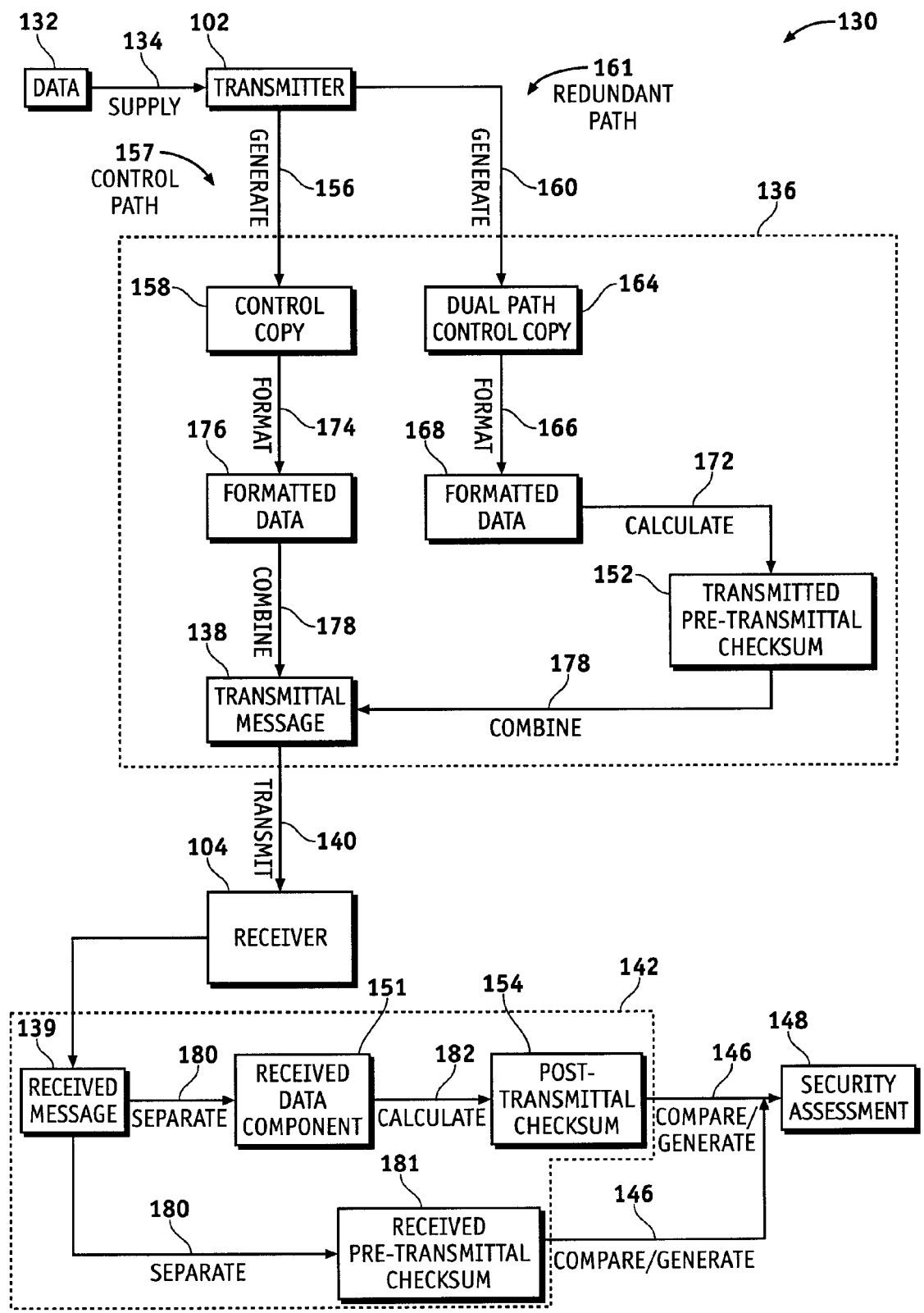
FIG. 5 provides a more detailed depiction of one embodiment of the method of FIG. 4.

FIG. 5 provides a more detailed depiction of various steps of the data preserving method 130. After the data 132 is supplied to the transmitter 102 in step 134, the transmitter 102 then generates, in step 156, a control copy 158 of the data 132 in a control path 157. In addition, in step 160, the transmitter generates a dual path control copy 164 of the data 132 in a redundant path 161. The dual path control copy 164 is formatted in step 166, thereby creating formatted data 168 for the redundant path 161. Then, in step 172, the formatted data 168 of the redundant path 161 is used to calculate the above-referenced transmitted pre-transmittal checksum 152. Meanwhile, in step 174, the control copy 158 of the data 132 is formatted, thereby creating formatted data 176 in the control path 157. Next, in step 178, the transmitted pre-transmittal checksum 152 from the redundant path 161 is combined with the formatted data 176 from the control path 157, thereby generating the transmittal message 138.

Next, in step 140, the transmittal message 138 is transmitted to the receiver 104, preferably via the link 106, where it takes the form of and/or is used to create the received message 139. Next, the receiver 104, in step 180, separates the received message 139 into a received data component 151 and the received pre-transmittal checksum 181. The post-transmittal checksum 154 is calculated from the received data component 151 in step 182, and is then, in step 146, compared with the received pre-transmittal checksum 181, and the security assessment 148 is generated. As depicted in FIG. 5, steps 156, 160, 166, 172, 174, and 178 collectively correspond with the encoding step 136 of the data preserving method 130, while steps 180 and 182 correspond with the decoding step 142, as referenced in FIG. 4. It will be appreciated that certain steps may differ in various embodiments, and/or that certain steps may occur simultaneously or in a different order.

Figure 6:
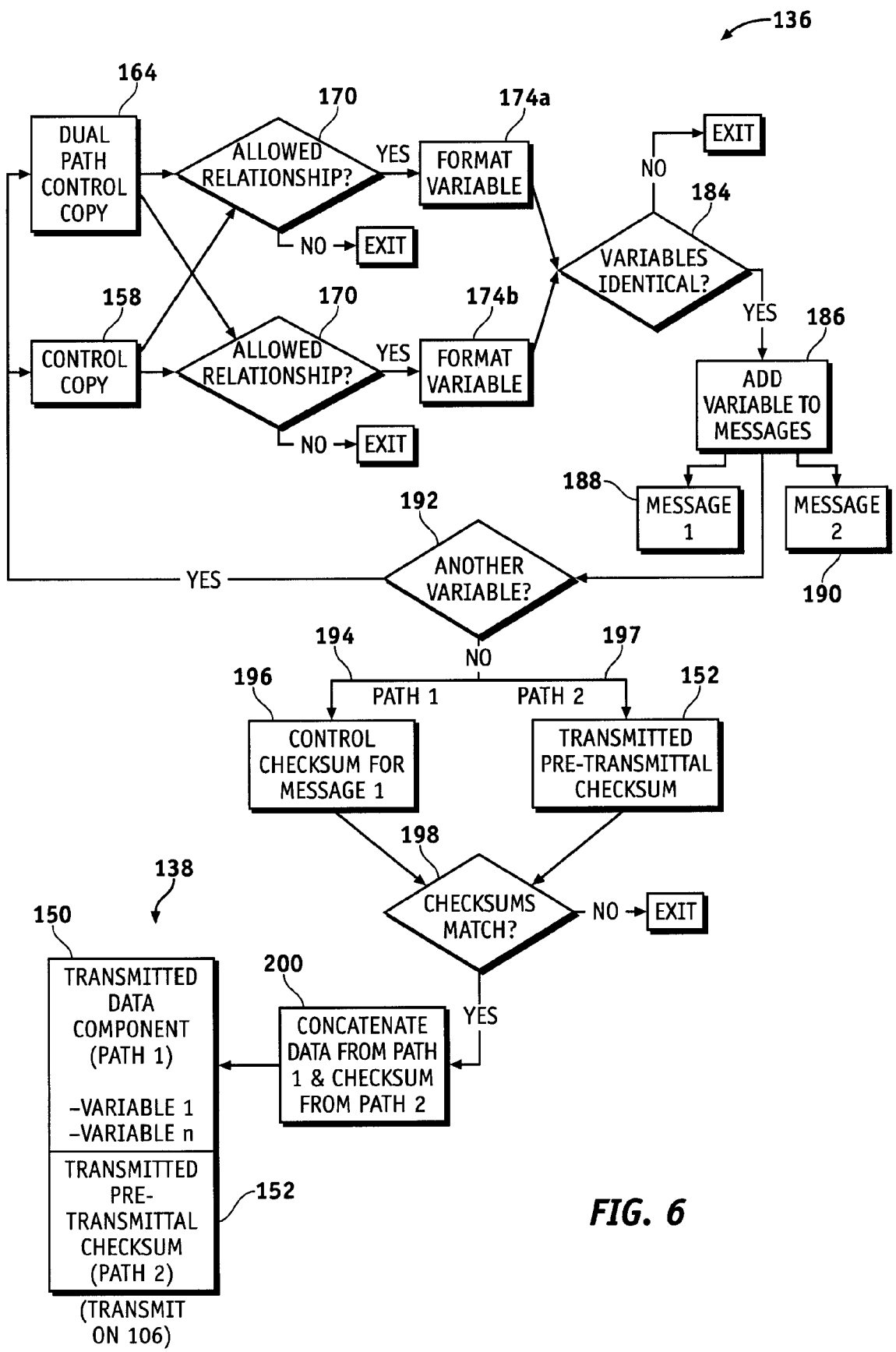
FIG. 6 depicts an embodiment of an encoding step associated with the method of FIG. 4.

For example, FIG. 6 depicts another embodiment pertaining to the encoding step 136, and with reference thereto, will now be described. The control copy 158 and the dual path control copy 164 of the data 132 are compared in step 170, and if these values satisfy an allowed relationship (for example, if the values are similar enough after rounding and/or other data manipulation), then the process continues. Otherwise, the process terminates. In step 174(*a*) and (*b*), the control copy 158 and the dual path control copy 164 are both formatted, preferably into CAN format or another suitable format for transmission on link 106.

Next, in step 184, the formatted variables are compared. If these values are unequal, then the process terminates. Otherwise, in step 186, the formatted variables are added to one or more paired messages, such as a control message 188 and a redundant message 190. Preferably, in step 186, the formatted variable values from the control copy 158 and the dual path control copy 164 are not combined together. Rather, preferably the formatted variable values from the control copy 158 are added to the control message 188, and those from the dual path control copy 164 are added to the redundant message 190, in step 186.

Next, in step 192, a check is conducted to determine if there are any additional variables for processing, of the specific variables that require such dual processing. If so, the process repeats, starting with step 170. Otherwise, the process proceeds to step 194, in which a control checksum 196 is calculated from the control message 188.

Meanwhile, in step 197, the transmitted pre-transmittal checksum 152 is calculated from the redundant message 190. Next, in step 198, the control checksum 196 is compared with the pre-transmittal checksum 152. If these values are unequal, then the process terminates. Otherwise, in step 200, the data from the control message 188 is concatenated and combined with the pre-transmittal checksum 152 from the redundant message 190, thereby generating the transmittal message 138. As shown in FIG. 6, the transmittal message 138 preferably includes at least a transmitted data component 150, and the transmitted pre-transmittal checksum 152. The transmittal message 138 is transmitted to the receiver 104 and takes the form of the received message 139, preferably via the link 106 (not shown in FIG. 6).

While the embodiment of FIG. 6 depicts variables requiring a redundant path, in various other embodiments there may be certain variables that do not require a redundant path. In such embodiments, the variables requiring a redundant path will preferably be subject to each of the steps set forth in FIG. 6. Meanwhile, certain other variables not requiring a redundant path can skip various steps, such as the creation of a dual path control copy 164, and/or some or all of the steps 170, 174, and 184, and can proceed directly to step 186, in which such variables are added to the messages 188 and 190 along with the variables requiring a redundant path.

Figure 7:
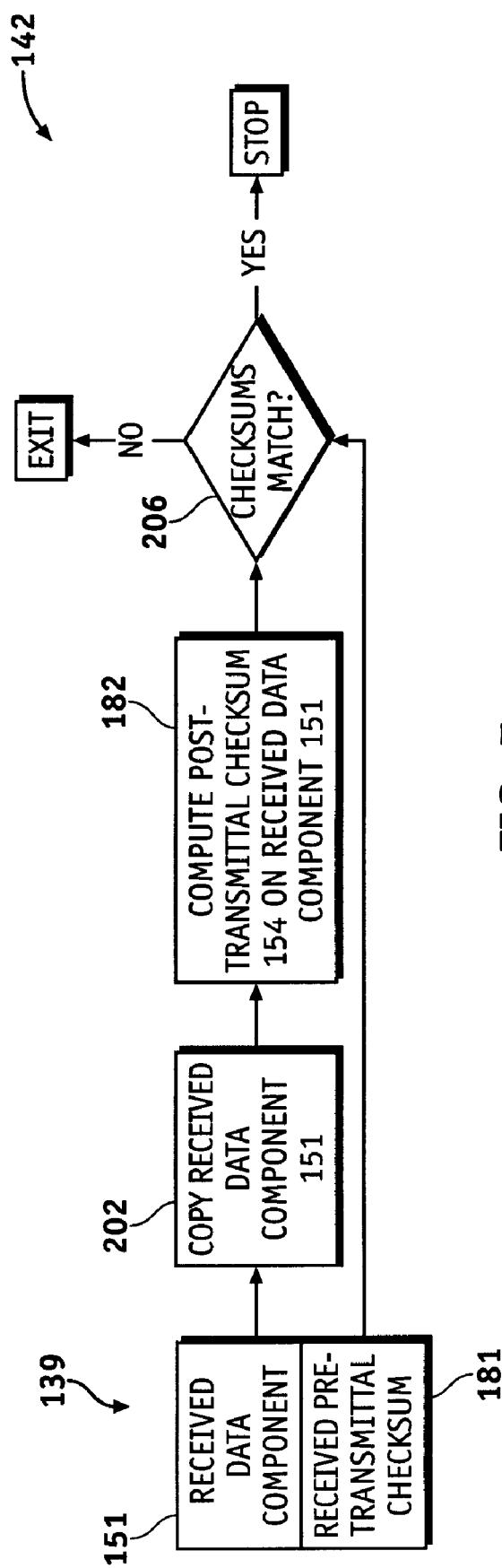
FIG. 7 depicts an embodiment of a decoding step associated with the method of FIG. 4.

Turning now to FIG. 7, an embodiment for the decoding step 142 of the data preserving method 130 is shown. After receiving the received message 139, with the received data component 151 and the received pre-transmittal checksum 181, the receiver 104 (not shown in FIG. 7), in step 202, generates a copy of the received data component 151. Next, in step 182, the post-transmittal checksum 154 is calculated from the received data component 151. Next, in step 206, the post-transmittal checksum 154 is compared with the received pre-transmittal checksum 181.

In embodiments where dual-path sensors are not available or are otherwise not deployed, a comparison or checksum may still be calculated based on another source of data other than original information. The concepts set forth above can still be applied in this case, however, using the concepts in check processes 220 and 320, and the implementations thereof, depicted in FIGS. 8-13 and described below. The check processes 220 and 320 are intended as illustrative examples of logical flow that illustrates broad concepts of the invention; they are not intended as literal software implementations, and may be modified, enhanced, differently organized or abbreviated substantially in many alternate but equivalent embodiments.

Figure 8:
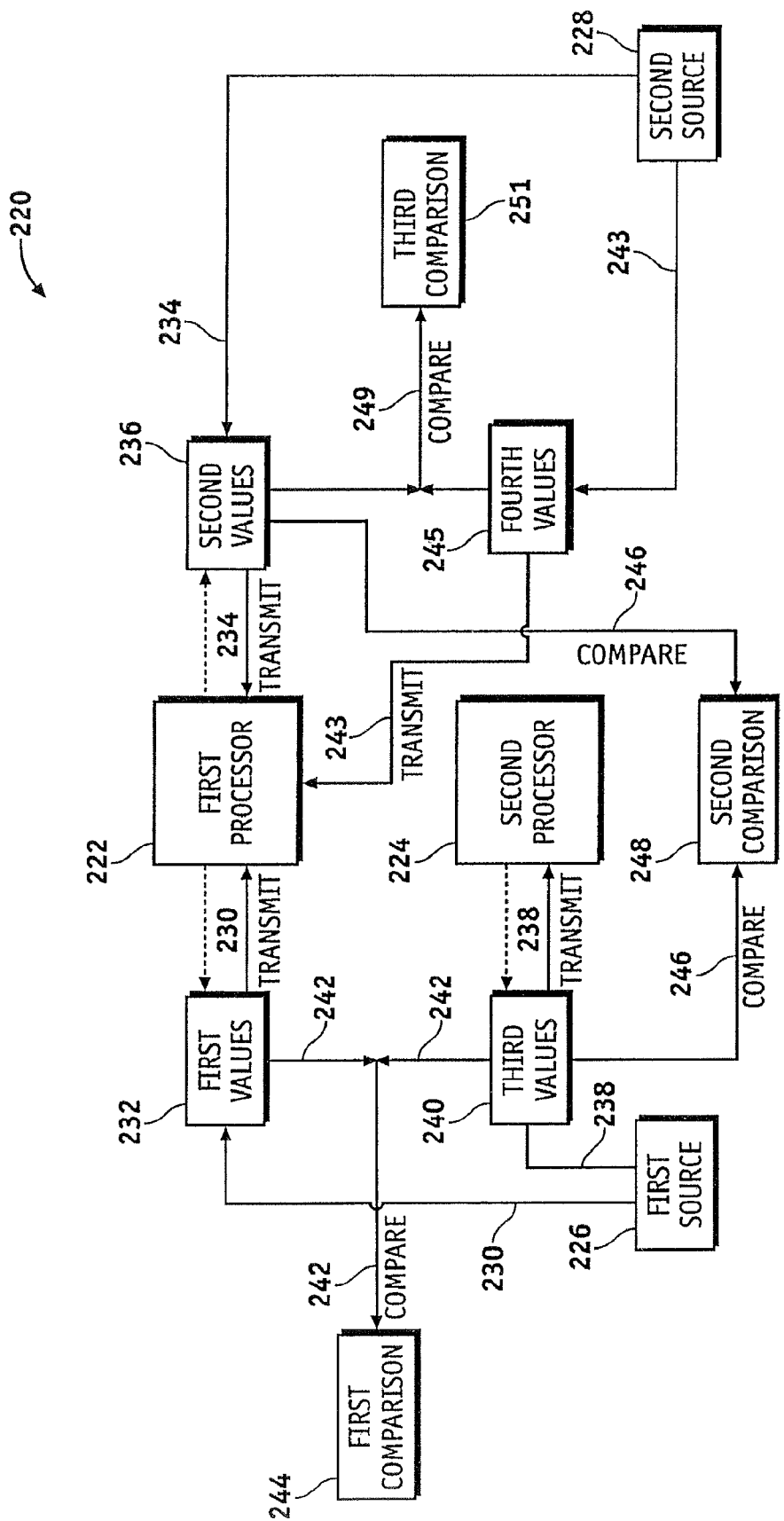
FIG. 8 depicts an embodiment of a process for securing data in an automobile when dual-path sensors are not available or are otherwise not deployed.

As depicted in FIG. 8, the check process 220 preferably utilizes at least a first processor 222, a second processor 224, and a first source 226 and a second source 228 for information regarding one or more data variables. First, in step 230, one or more first values 232 for the variable are transmitted from the first source 226 to the first processor 222. Next, in step 234, one or more second values 236 for the variable are transmitted from the second source 228 to the first processor 222. Next, in step 238, one or more third values 240 for the variable are transmitted from the first source 226 to the second processor 224. Next, in step 243, one or more fourth values 245 for the variable are transmitted from the second source 228 to the first processor 222.

Next, in step 242, the one or more first values 232 for the variable are compared with the one or more third values 240 for the variable, thereby generating a first comparison 244 for the variable values. Preferably the first comparison 244 is generated by subtracting these values from each other, and comparing the result to a dual stored calibrated value (which may be cross-checked prior to the comparison), which is determined based on main and secondary processor infrastructure (for example, by rounding, concatenation, or using another means).

Next, in step 246, the one or more second values 236 for the variable are compared with the one or more third values 240 for the variable, thereby generating a second comparison 248 for the variable values. Similar to the first comparison 244, the second comparison 248 is preferably generated by subtracting these values from each other, and comparing the result to a dual stored calibrated value (which may be cross-checked prior to the comparison), which is determined based on main and secondary processor infrastructure (for example, using rounding, concatenation, or some other method). It will be appreciated that this process can also be conducted with multiple variables, with one source, and/or multiple sources of information pertaining thereto.

Next, in step 249, the one or more second values 236 for the variable are compared with the one or more fourth values 245 for the variable, thereby generating a third comparison 251 for the variable values. The third comparison 251 is preferably generated by subtracting these values from each other, and comparing the result to a dual stored calibrated value (which may be cross-checked prior to the comparison), which is determined based on main and secondary processor infrastructure (for example, using rounding, concatenation, or some other method). It will be appreciated that this process can also be conducted with multiple variables, with one source, and/or multiple sources of information pertaining thereto.

Figure 9:
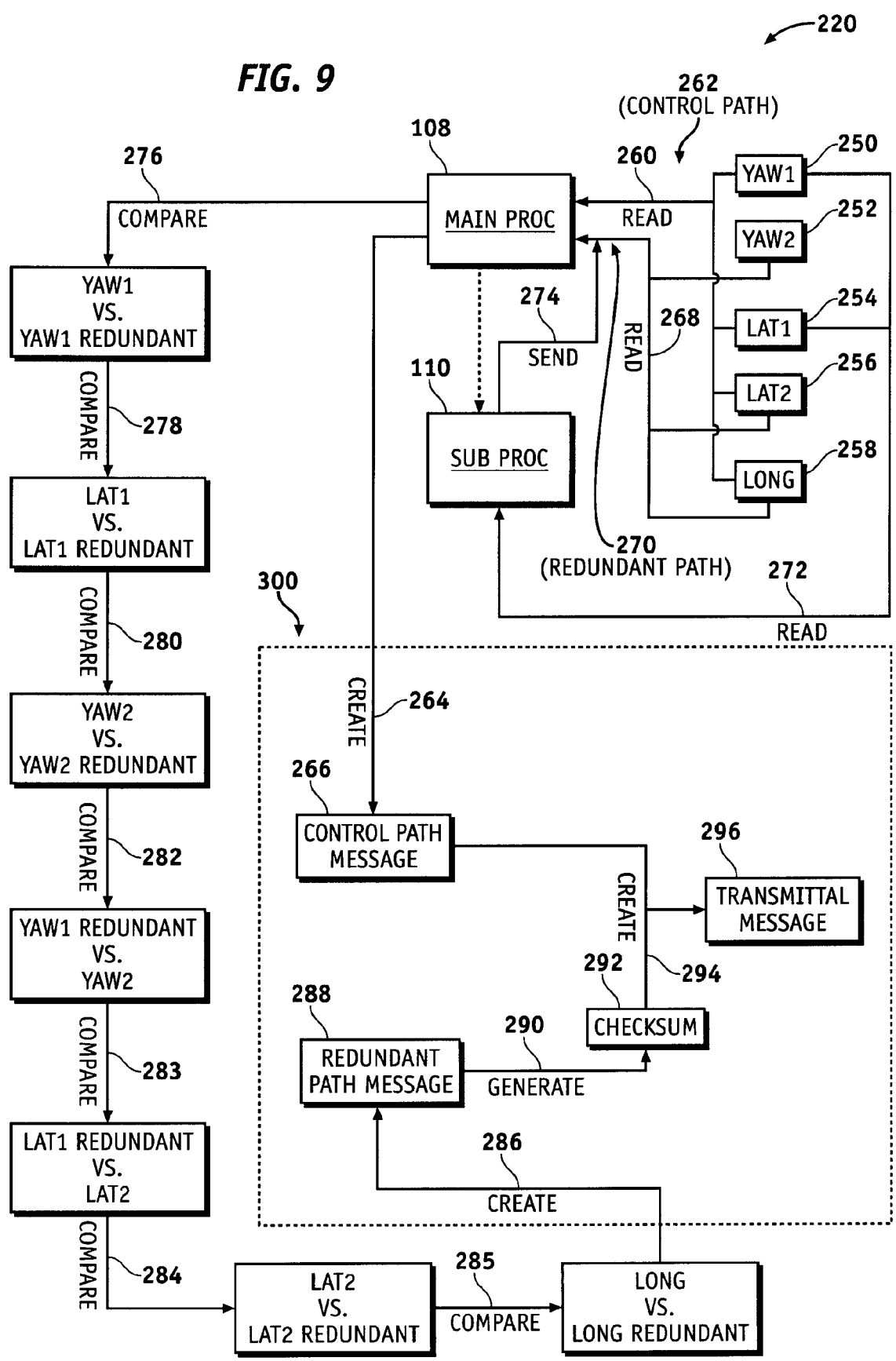
FIG. 9 depicts an alternative embodiment of the process of FIG. 8.

FIG. 9 depicts another embodiment of the check method 220, in which the first processor 222 is the main processor 108 and the second processor 224 is the sub-processor 110 of FIGS. 1-3. In addition, there are three variables (yaw rate, lateral acceleration, and longitudinal acceleration), and there are two sensors for two of the variables (first yaw sensor 250, second yaw sensor 252, first lateral acceleration sensor 254, and second lateral acceleration sensor 256), and one sensor for the remaining variable (longitudinal sensor 258). In step 260, the main processor 108 suitably reads the first and second yaw sensors 250, 252, the first and second lateral acceleration sensors 254, 256, and the longitudinal sensor 258, via a control path 262. The main processor 108, in step 264, then creates a control path message 266 including one or more of these values. In step 268, the main processor 108 also redundantly processes the second yaw sensor 252, the second lateral acceleration sensor 256, and the longitudinal sensor 258, via a redundant path 270.

In addition, in step 272, the sub-processor 110 suitably reads the first yaw sensor 250 and the first lateral acceleration sensor 254. Then, in step 274, the sub-processor 110 sends both the first yaw sensor 250 and the first lateral acceleration sensor 254 information to the redundant path 270 of the main processor 108.

Alternatively, as depicted in the arrow with dotted lines in FIG. 9, the main processor 108 may send certain values, such as information from the second yaw sensor 252, the second lateral acceleration sensor 256, and the longitudinal sensor 258, to the sub-processor 110 for redundant processing.

Next, in step 276, the main processor 108 compares the control path 262 value of the first yaw sensor 250 with the redundant path 270 value of the first yaw sensor 250. Preferably, in step 276, the main processor 108 subtracts these values from each other, and compares the result to a dual stored calibrated value (which may be cross-checked prior to the comparison), which is determined based on main and secondary processor infrastructure (for example, using rounding, concatenation, or some other method).

Similarly, in step 278, the main processor 108 suitably compares the control path 262 value of the first lateral acceleration sensor 254 and the redundant path 270 value of the first lateral acceleration sensor 254. Preferably, the main processor 108 subtracts these values from each other, and performs a check similar to the check described above.

Next, in step 280, the main processor 108 suitably performs a check between the value of the second yaw sensor 252 from the control path 262 versus that from the redundant path 270, preferably by subtracting these values from each other and comparing their results to dual stored calibrated value/s (which may be cross-checked prior to the comparison), which may then be determined based only on main infrastructure (for example, using rounding, concatenation, or some other method). Next, in step 282, the main processor 108 performs a similar check between the redundant path 270 value of the first yaw sensor 250 versus the control path 262 value of the second yaw sensor 252 and takes appropriate fail-soft action.

Then, in step 283, the main processor 108 performs a similar check between the redundant path 270 value of the first lateral acceleration sensor 254 versus the control path 262 value of the second later acceleration sensor 256. Then, in step 284, the main processor 108 similarly compares the value of the second lateral acceleration sensor 256 from the control path 262 versus that from the redundant path 270, and takes appropriate fail-soft action. Next, in step 285, the main processor 108 similarly compares the value of the longitudinal sensor 258 from the control path 262 versus that from the redundant path 270, and takes appropriate fail-soft action.

It will be appreciated that in various embodiments certain of the steps 276, 278, 280, 282, 283, 284, and 285 may occur in any one of a number of different orders. It will also be appreciated that certain steps may be omitted, and/or that certain other steps may be combined and/or repeated, in certain embodiments.

Next, in step 286, the main processor 108 suitably creates a redundant path message 288. Next, in step 290, a checksum value 292 is generated from the redundant path message 288. Next, in step 294, the main processor 108 appropriately concatenates and combines the control path message 266 with the checksum value 292, thereby creating a transmittal message 296 for transmission via the link 106.

As discussed above, in an alternative embodiment, some or all of these steps, including the redundant processing of data and/or the comparisons of data, can be instead performed by the sub-processor 110. Also, as denoted in FIG. 9, steps 264, 286, 290, and 294 will be collectively referenced herein as a combined step 300, as referenced in FIGS. 10-12 and discussed below.

Figure 10:
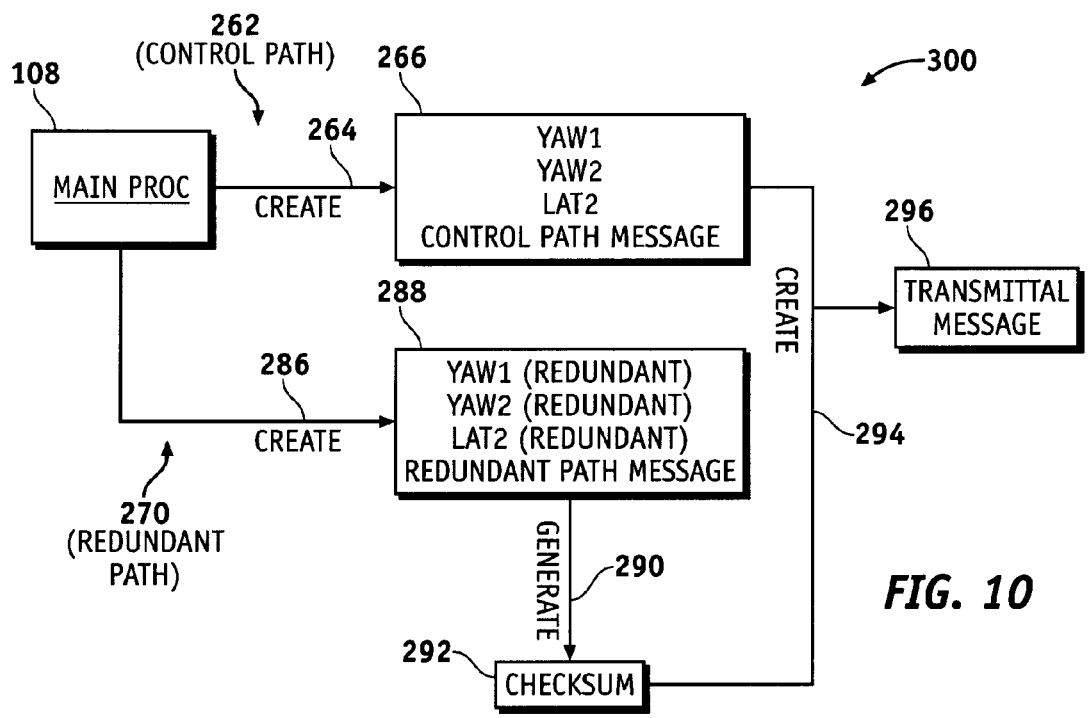
FIG. 10 depicts an embodiment of one step of the processes of FIGS. 8-9, involving the creation of a plurality of messages.

FIG. 10 depicts one embodiment of the combined step 300 of FIG. 9. In the embodiment of FIG. 10, in step 264 the main processor 108 generates a control path message 266, with at least values of the first yaw sensor 250, the second yaw sensor 252, and the second lateral acceleration sensor 256, all from the control path 262. Next, in step 286, the main processor 108 creates a redundant path message 288, with at least values of the first yaw sensor 250, the second yaw sensor 252, and the second lateral acceleration sensor 256, all from the redundant path 270. Next, in step 290, the checksum value 292 is generated from the redundant path message 288. Next, in step 294, the main processor 108 appropriately concatenates and combines the control path message 266 with the checksum value 292, thereby creating the transmittal message 296 for transmission via the link 106.

Figure 11:
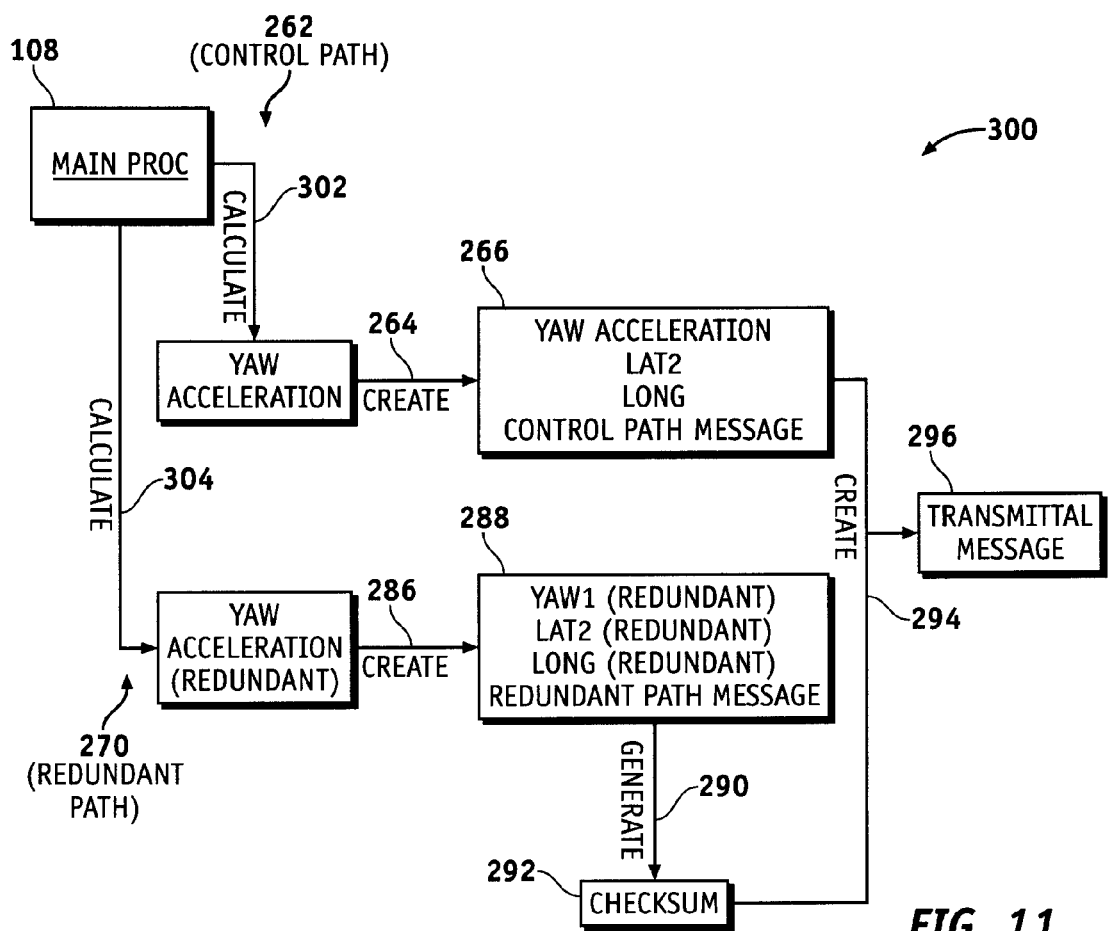
FIG. 11 depicts an alternate embodiment of the step of FIG. 10.

FIG. 11 depicts an alternate embodiment of the combined step 300 of FIG. 9. In the embodiment of FIG. 11, in step 302 the main processor 108 calculates a yaw acceleration value based on one or more values from the control path 262. The yaw acceleration value can be calculated based on control path 262 values from either of the first or second yaw sensors 250, 252, or from both of them, for example by using an average of the values of the first and second yaw sensors 250, 252. In step 304, the main processor 108 similarly calculates a yaw acceleration value based on one or more values from the redundant path 270, using redundant path 270 values from the first and/or second yaw sensors 250, 252.

Next, in step 264, the main processor 108 generates a control path message 266, with at least the yaw acceleration value from the control path 262 calculated in step 302, along with one or more values taken from the first and/or second lateral acceleration sensors 254, 256, preferably from the second lateral acceleration sensor 256, from the control path 262, and one or more values from the longitudinal sensor 258 from the control path 262. Similarly, in step 286, the main processor 108 creates a redundant path message 288, with at least the yaw acceleration value from the redundant path 270 calculated in step 304, along with one or more values taken from the first and/or second lateral acceleration sensors 254, 256, preferably from the second lateral acceleration sensor 256, from the redundant path 270, and one or more values from the longitudinal sensor 258 from the redundant path 270. The yaw acceleration values calculated in steps 302, 304 can serve as a useful check on the lateral acceleration and/or longitudinal acceleration values included therewith in the control path message 266 and the redundant path message 288.

Next, in step 290, the checksum value 292 is generated from the redundant path message 288. Next, in step 294, the main processor 108 appropriately concatenates and combines the control path message 266 with the checksum value 292, thereby creating the transmittal message 296 for transmission via the link 106.

Figure 12:
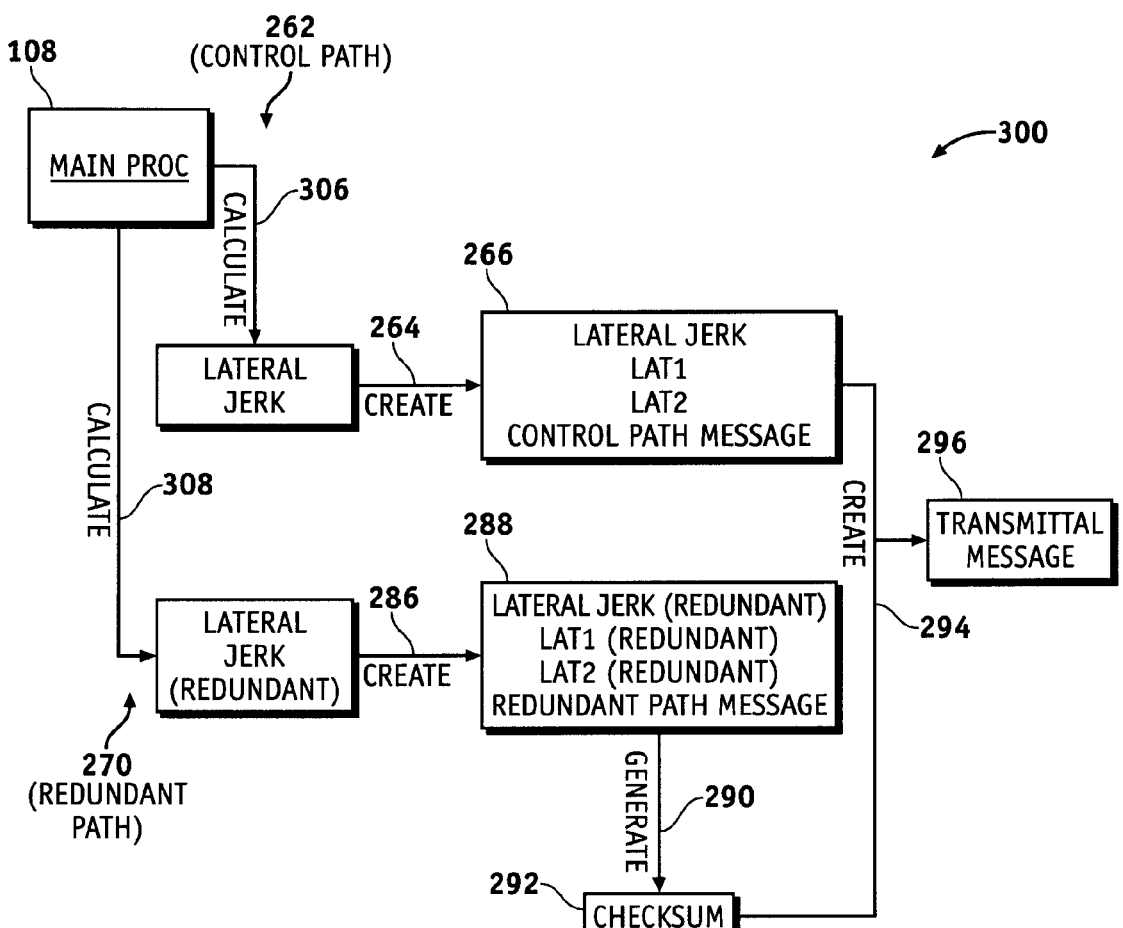
FIG. 12 depicts another alternate embodiment of the step of FIG. 10.

FIG. 12 depicts another alternate embodiment of the combined step 300 of FIG. 9. In the embodiment of FIG. 12, in step 306 the main processor 108 calculates a lateral jerk value based on one or more values from the control path 262. The lateral jerk value can be calculated based on control path 262 values from either of the first or second lateral acceleration sensors 254, 256, or from both of them, for example by using an average of the values of the first and second lateral acceleration sensors 254, 256. In step 308, the main processor 108 similarly calculates a lateral jerk value based on one or more values from the redundant path 270, using control path 270 values from the first and/or second lateral acceleration sensors 254, 256.

Next, in step 264, the main processor 108 generates a control path message 266, with at least the lateral jerk value from the control path 262 calculated in step 306, along with one or more values taken from the first and second lateral acceleration sensors 254, 256 from the control path 262. Similarly, in step 286, the main processor 108 creates a redundant path message 288, with at least the lateral jerk value from the redundant path 270 calculated in step 308, along with one or more values taken from the first and second lateral acceleration sensors 254, 256 from the redundant path 270. The lateral jerk values calculated in steps 306, 308 can serve as a useful check on the lateral acceleration values included therewith in the control path message 266 and the redundant path message 288.

Next, in step 290, the checksum value 292 is generated from the redundant path message 288. Next, in step 294, the main processor 108 appropriately concatenates and combines the control path message 266 with the checksum value 292, thereby creating the transmittal message 296 for transmission via the link 106.

It will be appreciated that FIGS. 10-12 are only intended to depict illustrative embodiments of step 300. In various embodiments, the steps and/or order thereof may vary, and may result in different control path messages 266, redundant path messages 288, and/or transmittal messages 296, for example with different variable combinations.

The exemplary approach above is based on the sub-processor 110 sending the first yaw sensor 250 and the first lateral acceleration 254 information to the main processor 108. However, a similar approach could be developed, for example by sending the second yaw sensor 252, the second lateral acceleration sensor 256 and the longitudinal sensor 258 information from the main processor 108 to the sub-processor 110, or by otherwise altering the respective roles of the main and sub processors 108, 110. Additionally, a fail-soft strategy that isolates only components or modules with identified faults may be based on parameters in each message rather than all sensor parameters, as is commonly the case in many conventional systems 100, thereby reducing the need to shut down the entire system 100 or transmitter 102 in the event of an identified fault.

Figure 13:
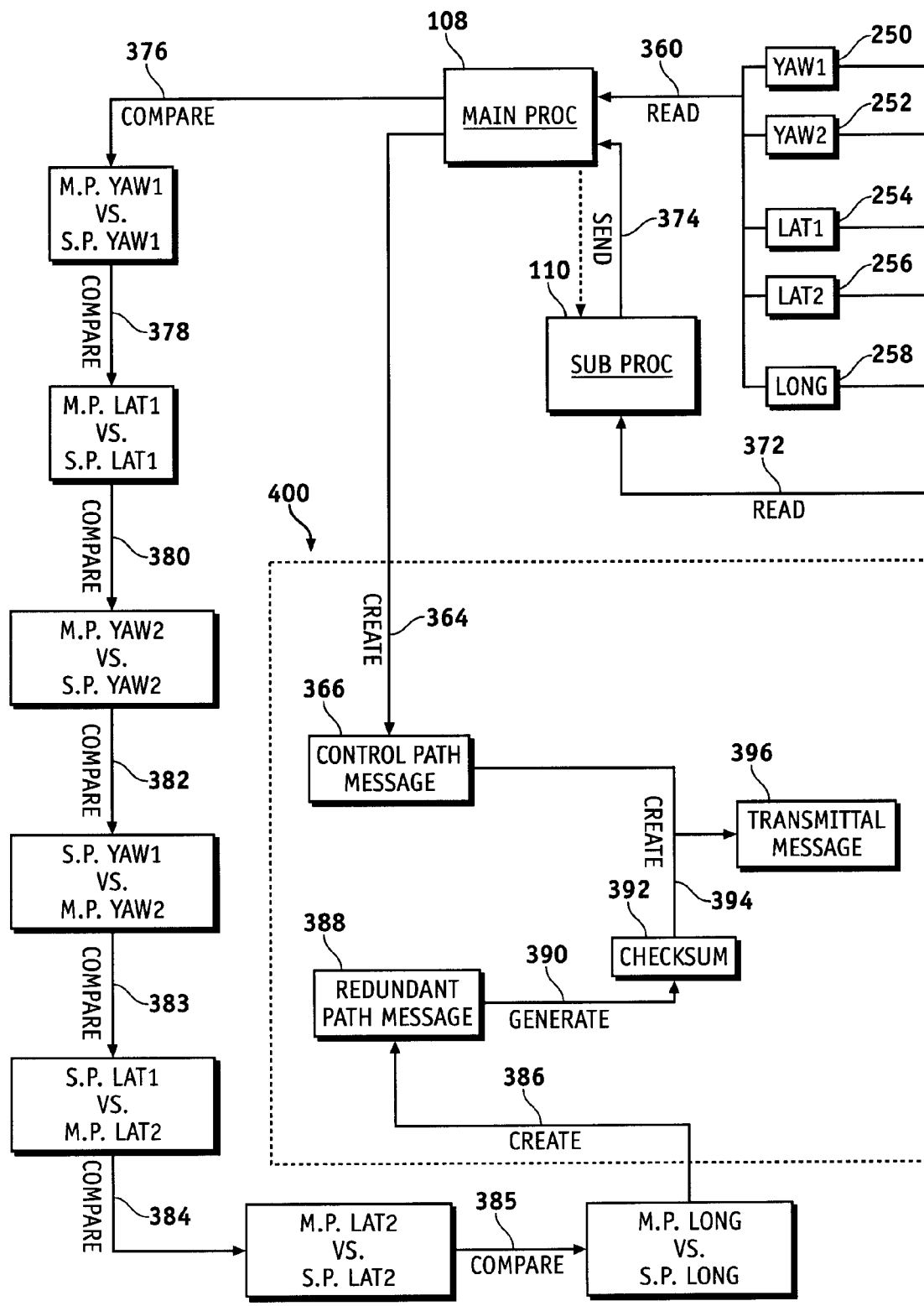
FIG. 13 depicts another process for securing data in an automobile when dual-path sensors are not available or are otherwise not deployed.

FIG. 13 depicts an alternative process 320 for securing data in an automobile when dual-path sensors are not available or are otherwise not employed, also using the main processor 108 and the sub-processor 110, the first yaw sensor 250, the second yaw sensor 252, the first lateral acceleration sensor 254, the second lateral acceleration sensor 256, and the longitudinal sensor 258. First, in step 360, the main processor 108 suitably reads the first and second yaw sensors 250, 252, the first and second lateral acceleration sensors 254, 256, and the longitudinal sensor 258. The main processor 108, in step 364, then creates a control path message 366 including one or more of these values obtained by the main processor 108.

In addition, in step 372, the sub-processor 110 suitably reads the first yaw sensor 250, the second yaw sensor 252, the first lateral acceleration sensor 254, the second lateral acceleration sensor 256, and the longitudinal sensor 258, and then, in step 374, sends the information from each of these sensors to the main processor 108. Alternatively, this or other information may be sent from the main processor 108 to the sub-processor 110, as shown in the arrow with the dotted lines in FIG. 13, and/or that various other steps of the one of the processors may be performed by the other processor in certain embodiments.

Next, in step 376, the main processor 108 compares its value of the first yaw sensor 250 with the sub-processor 110's value of the first yaw sensor 250. Preferably, in step 376, the main processor 108 subtracts these values from each other, and compares the result to a dual stored calibrated value (which may be cross-checked prior to the comparison), which is determined based on main and secondary processor infrastructure (for example, using rounding, concatenation, or some other method).

Similarly, in step 378, the main processor 108 suitably compares its value of the first lateral acceleration sensor 254 with the sub-processor 110's value of the first lateral acceleration sensor 254. Preferably, the main processor 108 subtracts these values from each other, and performs a check similar to the check described above. Next, in step 380, the main processor 108 performs a similar check between its value of the second yaw sensor 252 with the sub-processor 10's value of the second yaw sensor 252. Next, in step 382, the main processor 108 performs a similar check between its value of the second yaw sensor 252 with the sub-processor 110's value of the first yaw sensor 250. Next, in step 383, the main processor 108 performs a similar check between its value of the second lateral acceleration sensor 256 with the sub-processor 110's value of the first lateral acceleration sensor 254.

Next, in step 384, the main processor 108 performs a similar check between its value of the second lateral acceleration sensor 256 with the sub-processor 10's value of the second lateral acceleration sensor 256. Next, in step 385, the main processor 108 performs a similar check between its value of the longitudinal acceleration sensor 258 and the sub-processor 110's value of the longitudinal acceleration sensor 258.

It will be appreciated that in various embodiments certain of the steps 376, 378, 380, 382, 383, 384, and 385 may occur in any one of a number of different orders. It will also be appreciated that certain steps may be omitted, and/or that certain other steps may be combined and/or repeated, in certain embodiments.

Next, in step 386, the main processor 108 suitably creates a redundant path message 388, from the variable values obtained from the second processor 110. Next, in step 390, a checksum value 392 is generated from the redundant path message 388. Next, in step 394, the main processor 108 appropriately concatenates and combines the control path message 366 with the checksum value 392, thereby creating a transmittal message 396 for transmission via the link 106. It will be appreciated that in various embodiments, the steps and/or order thereof may vary, and may result in different control path messages 366, redundant path messages 388, and/or transmittal messages 396, for example with different variable combinations, including variables similar to those depicted in FIGS. 10-12, and/or any of numerous other potential combinations of variables.

Using the techniques described above, data security and integrity can be increased within an automotive or other data processing system through the use of redundancy and other dual-path techniques. As noted above, the particular techniques described herein may be modified in a wide array of practical embodiments, and/or may be deployed in any type of data collection, control, or other processing environment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of cross-checking values of data for at least one variable transmitted in a system comprising a first processor, a second processor, a first source of values for the variable, and a second source of values for the variable, the method comprising the steps of:
   transmitting one or more first values for the variable from the first source of values for the variable to the first processor;
   transmitting one or more second values for the variable from the second source of values for the variable to the first processor;
   transmitting one or more third values for the variable from the first source of values for the variable to the second processor;
   transmitting one or more fourth values for the variable from the second source of values for the variable to the first processor;
   comparing the one or more first values for the variable with the one or more third values for the variable;
   comparing the one or more second values for the variable with the one or more third values for the variable; and
   comparing the one or more second values for the variable with the one or more fourth values for the variable.

2. The method of claim 1, further comprising the step of:
   sending at least certain of the values for the variable from the first processor to the second processor for redundant processing.

3. The method of claim 1, further comprising the step of:
   sending at least certain of the values for the variable from the second processor to the first processor for redundant processing.

4. The method of claim 1, wherein the data is also for at least an additional variable and the system further comprises a source of values for the additional variable, the method further comprising the steps of:
   transmitting one or more first values for the additional variable from the first source of values for the additional variable to the first processor;
   transmitting one or more second values for the additional variable from the second source of values for the additional variable to the first processor;
   transmitting one or more third values for the additional variable from the first source of values for the additional variable to the second processor;
   transmitting one or more fourth values for the additional variable from the second source of values for the additional variable to the first processor;
   comparing the one or more first values for the additional variable with the one or more third values for the additional variable;
   comparing the one or more second values for the additional variable with the one or more third values for the additional variable; and
   comparing the one or more second values for the additional variable with the one or more fourth values for the additional variable.

5. the method of claim 4, wherein the data is also for at least a separate additional variable and the system further comprises a first source and a second source of values for the separate additional variable, the method further comprising the steps of:
   transmitting one or more first values for the separate additional variable from the first source of values for the separate additional variable to the first processor;
   transmitting one or more second values for the separate additional variable from the second source of values for the separate additional variable to the first processor; and
   comparing the one or more first values for the separate additional variable with the one or more second values for the separate additional variable.

6. The method of claim 5, wherein at least one of the variable, the additional variable, and/or the separate additional variable is selected from the group consisting of: yaw, lateral acceleration, and longitudinal acceleration.

7. The method of claim 6, wherein the variable, the additional variable, and the separate additional variable are each selected from the group consisting of: yaw, lateral acceleration, and longitudinal acceleration.

8. A method of cross-checking values of variable data including at least a yaw rate variable, a lateral acceleration variable, and a longitudinal acceleration variable, transmitted in a system comprising a first processor, a second processor, a first yaw sensor and a second yaw sensor for measuring values for the yaw rate variable, a first lateral acceleration sensor and a second lateral acceleration sensor for measuring values for the lateral acceleration variable, and a longitudinal sensor for measuring values for the longitudinal variable, the method comprising the steps of:
   transmitting one or more first yaw rate values from the first yaw sensor to the first processor;
   transmitting one or more second yaw rate values from the second yaw sensor to the first processor;
   transmitting one or more third yaw rate values from the first yaw sensor to the second processor;
   transmitting one or more fourth yaw rate values from the second yaw sensor to the first processor;
   transmitting one or more first lateral acceleration values from the first lateral acceleration sensor to the first processor;
   transmitting one or more second lateral acceleration values from the second lateral acceleration sensor to the first processor;
   transmitting one or more third lateral acceleration values from the first lateral acceleration sensor to the second processor;
   transmitting one ore more fourth lateral acceleration values from the second lateral acceleration sensor to the first processor;
   transmitting one or more first longitudinal values from the longitudinal sensor to the first processor;
   transmitting one or more second longitudinal values from the longitudinal sensor to the first processor;
   comparing the one or more first yaw rate values with the one or more third yaw rate values;
   comparing the one or more second yaw rate values with the one or more third yaw rate values;
   comparing the one or more second yaw rate values with the one or more fourth yaw rate values;
   comparing the one or more first lateral acceleration values with the one or more third lateral acceleration values;
   comparing the one or more second lateral acceleration values with the one or more third lateral acceleration values;
   comparing the one or more second lateral acceleration values with the one or more fourth lateral acceleration values; and
   comparing the one or more first longitudinal values with the one or more second longitudinal values.

9. The method of claim 8, further comprising the steps of:
generating a checksum from at least the one or more third yaw rate values, the one or more fourth yaw rate values, and the one or more fourth lateral acceleration values; and generating a message comprising the checksum and the one or more first yaw rate values, the one or more second yaw rate values, and the one or more second lateral acceleration values.

10. The method of claim 8, further comprising the steps of:
calculating one or more first yaw acceleration values;
calculating one or more second yaw acceleration values;
generating a checksum from at least the one or more third lateral acceleration values, the one or more second longitudinal acceleration values, and the one or more second calculated yaw acceleration values; and
generating a message comprising the checksum and the one or more first lateral acceleration values, the one or more first longitudinal acceleration values, and the one or more first calculated yaw acceleration values.

11. The method of claim 10, wherein the one or more first and second yaw acceleration values are calculated from one or more of the first, second, third, and fourth yaw rate values.

12. The method of claim 8, further comprising the steps of:
calculating one or more first lateral jerk values;
calculating one or more second lateral jerk values;
generating a checksum from at least the one or more third lateral acceleration values, the one or more fourth lateral acceleration values, and the one or more second calculated lateral jerk values; and
generating a message comprising the checksum and the one or more first lateral acceleration values, the one or more second lateral acceleration values, and the one or more first calculated lateral jerk values.

13. The method of claim 12, wherein the one or more first and second lateral jerk values are calculated from one or more of the first, second, third, and fourth lateral acceleration values.

14. An apparatus for cross-checking values of variable data including at least a yaw rate variable, a lateral acceleration variable, and a longitudinal acceleration variable, transmitted in a system comprising a first processor, a second processor, a first yaw sensor and a second yaw sensor for measuring values for the yaw rate variable, a first lateral acceleration sensor and a second lateral acceleration sensor for measuring values for the lateral acceleration variable, and a longitudinal sensor for measuring values for the longitudinal variable, the apparatus comprising:
means for transmitting one or more first yaw rate values from the first yaw sensor to the first processor;
means for transmitting one or more second yaw rate values from the second yaw sensor to the first processor;
means for transmitting one or more third yaw rate values from the first yaw sensor to the second processor;
means for transmitting one or more fourth yaw rate values from the second yaw sensor to the first processor;
means for transmitting one or more first lateral acceleration values from the first lateral acceleration sensor to the first processor;
means for transmitting one or more second lateral acceleration values from the second lateral acceleration sensor to the first processor;
means for transmitting one or more third lateral acceleration values from the first lateral acceleration sensor to the second processor;
means for transmitting one ore more fourth lateral acceleration values from the second lateral acceleration sensor to the first processor;
means for transmitting one or more first longitudinal values from the longitudinal sensor to the first processor;
means for transmitting one or more second longitudinal values from the longitudinal sensor to the first processor;
means for comparing the one or more first yaw rate values with the one or more third yaw rate values;
means for comparing the one or more second yaw rate values with the one or more third yaw rate values;
means for comparing the one or more second yaw rate values with the one or more fourth yaw rate values;
means for comparing the one or more first lateral acceleration values with the one or more third lateral acceleration values;
means for comparing the one or more second lateral acceleration values with the one or more third lateral acceleration values;
means for comparing the one or more second lateral acceleration values with the one or more fourth lateral acceleration values; and
means for comparing the one or more first longitudinal values with the one or more second longitudinal values.

15. The apparatus of claim 14, further comprising:
means for generating a checksum from at least the one or more third yaw rate values, the one or more fourth yaw rate values, and the one or fourth lateral acceleration values; and
means for generating a message comprising the checksum and the one or more first yaw rate values, the one or more second yaw rate values, and the one or more second lateral acceleration values.

16. The apparatus of claim 14, further comprising:
means for calculating one or more first yaw acceleration values;
means for calculating one or more second yaw acceleration values;
means for generating a checksum from at least the one or more third lateral acceleration values, the one or more second longitudinal acceleration values, and the one or more second calculated yaw acceleration values; and
means for generating a message comprising the checksum and the one or more first lateral acceleration values, the one or more first longitudinal acceleration values, and the one or more first calculated yaw acceleration values.

17. The apparatus of claim 16, wherein the means for calculating the one or more first and second yaw acceleration values comprises:
means for calculating the one or more first and second yaw acceleration values from one or more of the first, second, third, and fourth yaw rate values.

18. The apparatus of claim 14, further comprising:
means for calculating one or more first lateral jerk values;
means for calculating one or more second lateral jerk values;
means for generating a checksum from at least the one or more third lateral acceleration values, the one or more fourth lateral acceleration values, and the one or more second calculated lateral jerk values; and
means for generating a message comprising the checksum and the one or more first lateral acceleration values, the one or more second lateral acceleration values, and the one or more first calculated lateral jerk values.

19. The apparatus of claim 18, wherein the means for calculating the one or more first and second lateral jerk values comprises:

means for calculating the one or more first and second lateral jerk values from one or more of the first, second, third, and fourth lateral acceleration values.

20. A method of cross-checking values of variable data including at least a yaw rate variable, a lateral acceleration variable, and a longitudinal acceleration variable, transmitted in a system comprising a first processor, a second processor, a first yaw sensor and a second yaw sensor for measuring values for the yaw rate variable, a first lateral acceleration sensor and a second lateral acceleration sensor for measuring values for the lateral acceleration variable, and a longitudinal sensor for measuring values for the longitudinal variable, the method comprising the steps of:

transmitting one or more first yaw rate values from the first yaw sensor to the first processor;

transmitting one or more second yaw rate values from the second yaw sensor to the first processor;

transmitting one or more third yaw rate values from the first yaw sensor to the second processor;

transmitting one or more fourth yaw rate values from the second yaw sensor to the second processor;

transmitting one or more first lateral acceleration values from the first lateral acceleration sensor to the first processor;

transmitting one or more second lateral acceleration values from the second lateral acceleration sensor to the first processor;

transmitting one or more third lateral acceleration values from the first lateral acceleration sensor to the second processor;

transmitting one ore more fourth lateral acceleration values from the second lateral acceleration sensor to the second processor;

transmitting one or more first longitudinal values from the longitudinal sensor to the first processor;

transmitting one or more second longitudinal values from the longitudinal sensor to the first processor;

comparing the one or more first yaw rate values with the one or more third yaw rate values;

comparing the one or more second yaw rate values with the one or more third yaw rate values;

comparing the one or more second yaw rate values with the one or more fourth yaw rate values;

comparing the one or more first lateral acceleration values with the one or more second lateral acceleration values;

comparing the one or more second lateral acceleration values with the one or more third lateral acceleration values;

comparing the one or more second lateral acceleration values with the one or more fourth lateral acceleration values; and comparing the one or more first longitudinal values with the one or more second longitudinal values.

* * * * *